United States Patent [19]
Hoffman et al.

[11] Patent Number: 5,346,406
[45] Date of Patent: Sep. 13, 1994

[54] ELECTRICAL CABLE AND CONNECTOR ASSEMBLY WITH SAFETY PILOT LINE DISCONNECT, ESPECIALLY FOR ELECTRIC VEHICLE

[75] Inventors: Ernest G. Hoffman, Middlefield; Alfred L. Ehrenfels, Cheshire, both of Conn.

[73] Assignee: Hubbell Incorporated, Orange, Conn.

[21] Appl. No.: 55,025

[22] Filed: Apr. 30, 1993

[51] Int. Cl.$^5$ .................. H01R 11/22; H01R 23/02
[52] U.S. Cl. ..................... 439/474; 439/891; 439/924
[58] Field of Search ............. 439/34, 474, 475, 152, 439/153, 155, 879, 891, 911, 923, 924

[56] References Cited

U.S. PATENT DOCUMENTS

| | | | |
|---|---|---|---|
| 554,263 | 2/1896 | Guilleaume | 361/108 |
| 1,690,580 | 11/1928 | Hedley et al. | 361/108 |
| 1,947,503 | 2/1934 | Shunk | 361/108 |
| 2,478,147 | 8/1949 | Wilson | 361/107 |
| 3,270,267 | 8/1966 | Nolte, Jr. | 439/484 |
| 3,933,404 | 1/1976 | Oehlerking et al. | 439/474 |
| 4,011,483 | 3/1977 | Meadows | 361/107 |
| 4,158,802 | 6/1979 | Rose, II | 302/2 |
| 4,431,241 | 2/1984 | Hazelhurt | 339/43 |
| 4,843,477 | 6/1989 | Mizutani et al. | 358/248 |
| 5,248,259 | 9/1993 | Naito et al. | 439/34 |

OTHER PUBLICATIONS

"Infrastructure-EV Charging Meter", Green Car Journal, Nov. 1992, p. 124.
Hubbell GFC Interlock-Electric Vehicle Charging Connection System: 1Q92, Feb. 13, 1992.

*Primary Examiner*—Neil Abrams
*Attorney, Agent, or Firm*—Jerry M. Presson; David L. Tarnoff; Alfred N. Goodman

[57] ABSTRACT

An electrical cable and connector assembly for electrically coupling equipment to a power source, and having an electrical cable with a plurality of power conductors and a pilot conductor releasably coupled to an electrical contact in an electrical connector, so that the pilot conductor releases from the electrical contact of the connector when a mechanical stress or force is applied to the cable. The pilot conductor releases from the contact of the connector prior to damage occurring to the remaining conductors from the stress or force applied to the cable. The power conductors are spirally wrapped about the centrally located pilot conductor so that the power conductors can stretch while the pilot conductor is pulled from its electrical contact upon application of the force or stress on the cable. In another embodiment, a non-conducting line or wire is connected to the ends of one of the conductors so that the stress or force applied to the cable is transmitted to the non-conducting line instead of to any of the conductors. Specifically, the non-conducting line is shorter than the conductors so that when the non-conducting line is stressed, the releasable end of the conductor will disconnect from its contact before stress is transmitted to the conductors.

27 Claims, 10 Drawing Sheets

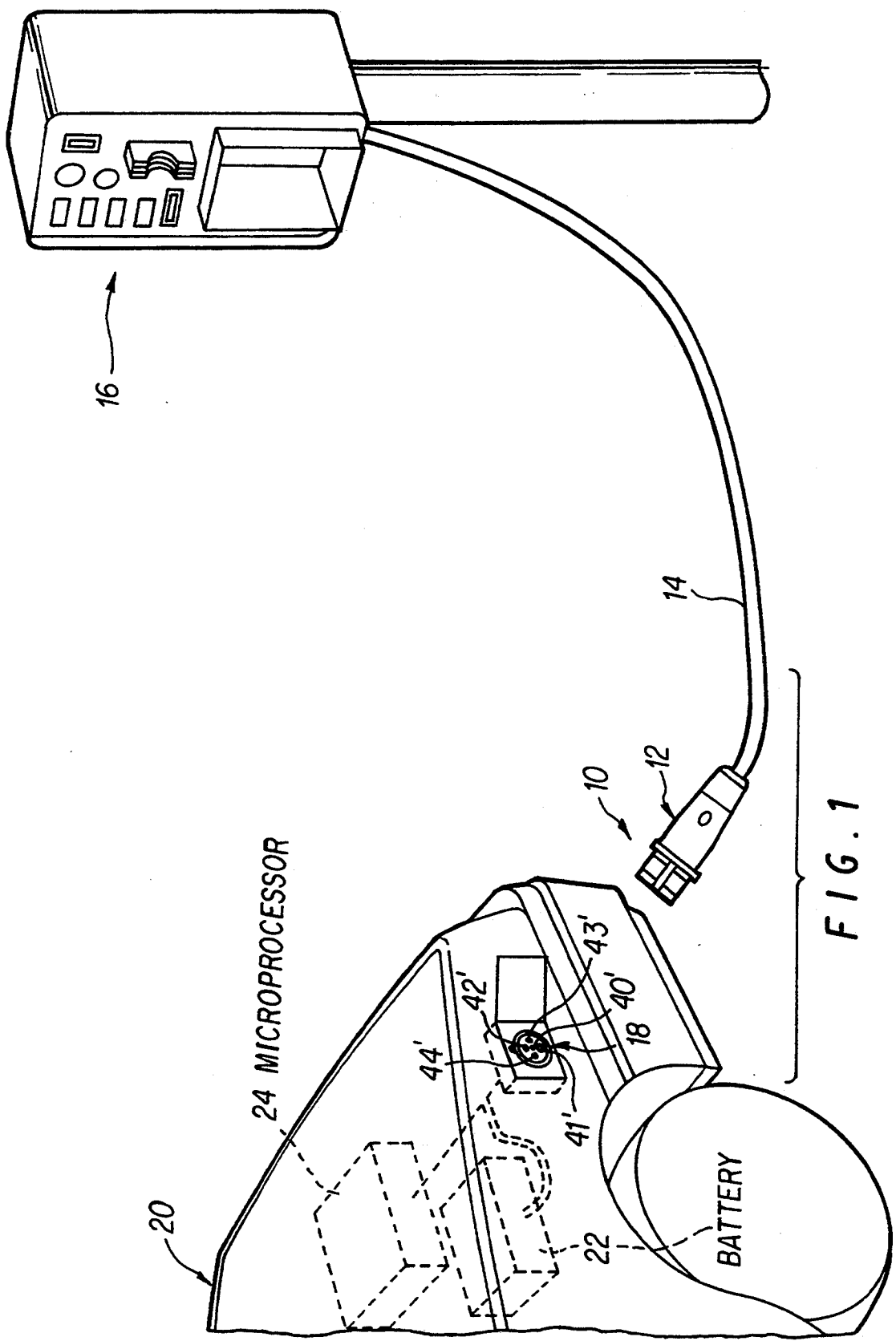

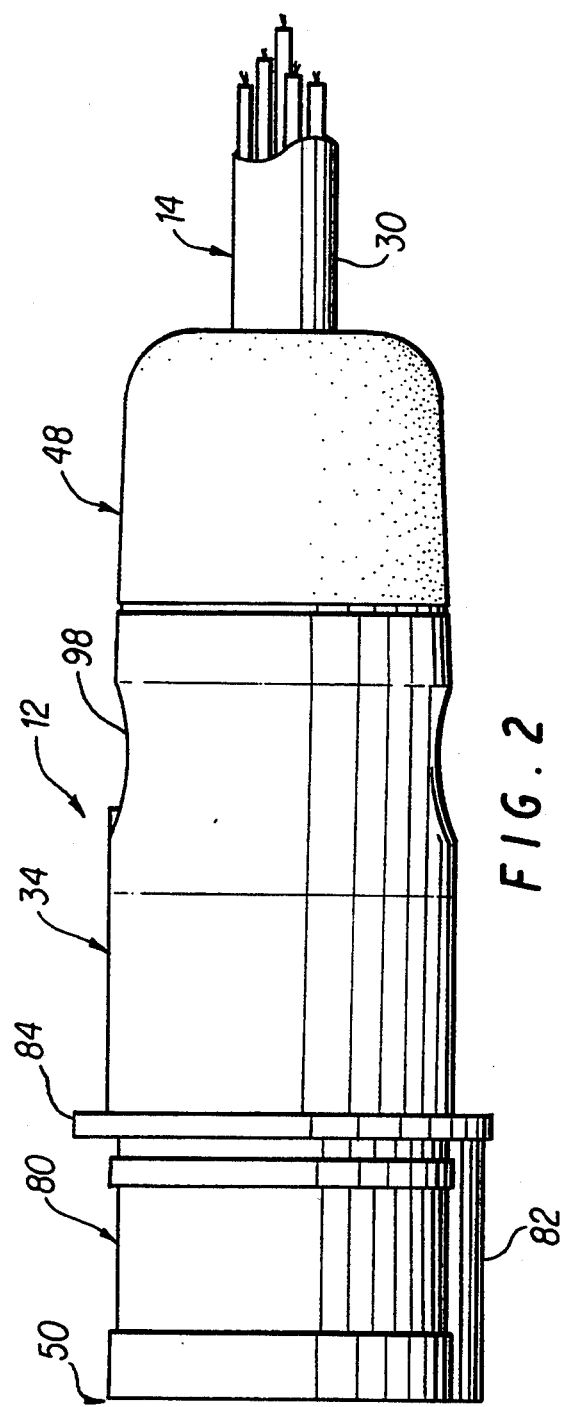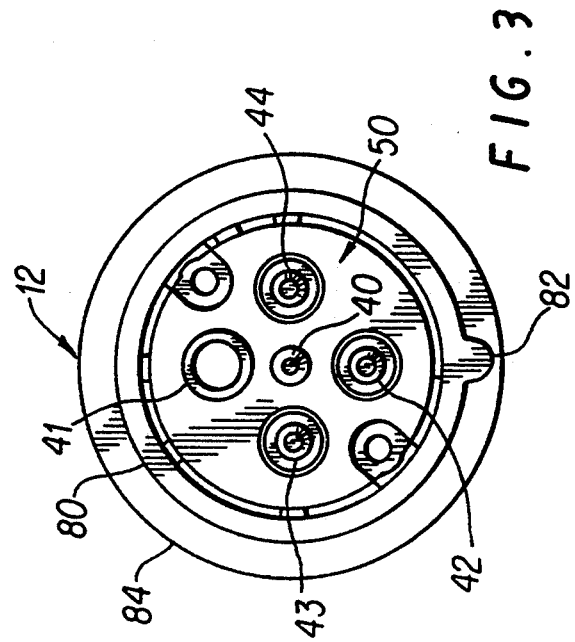

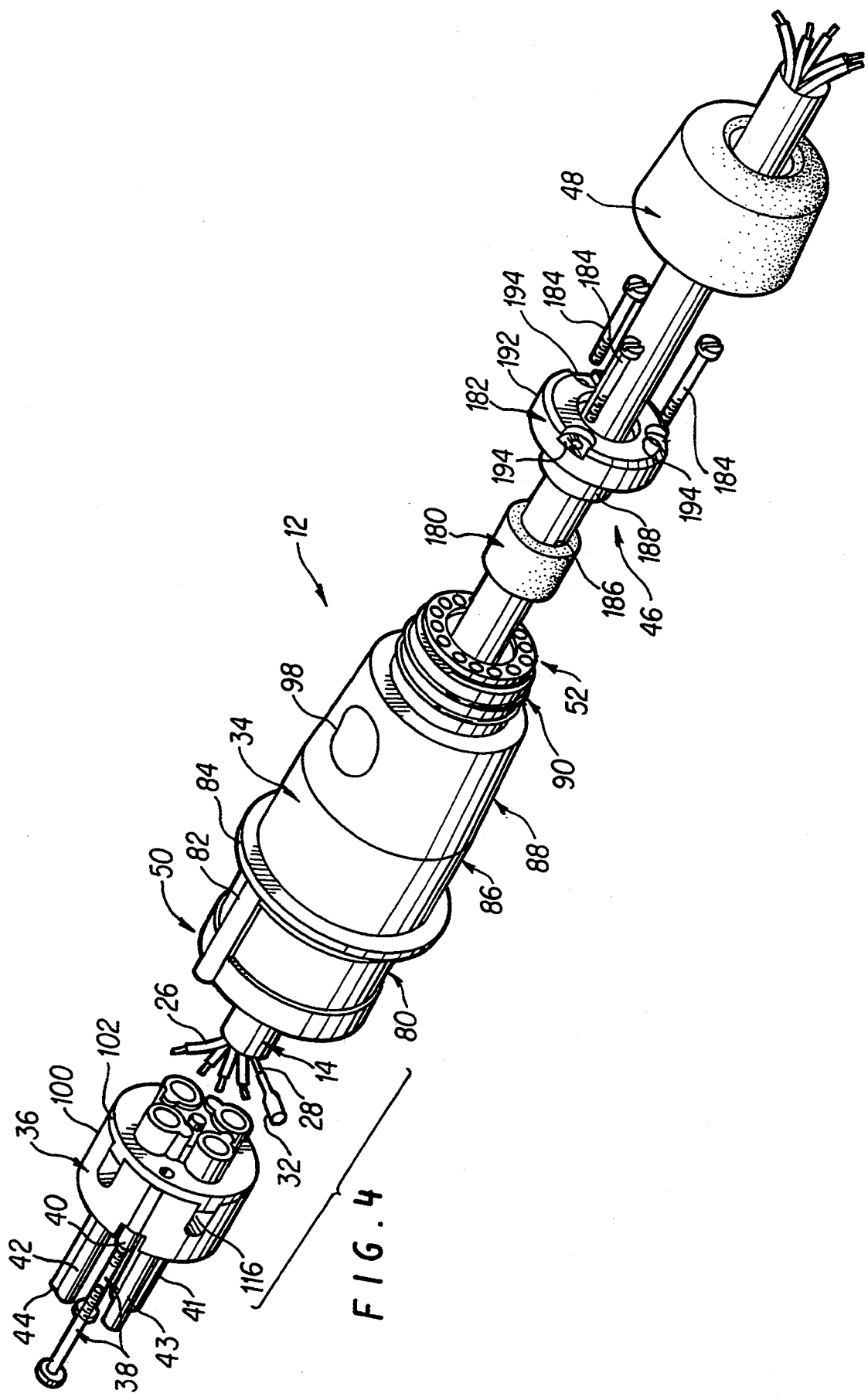

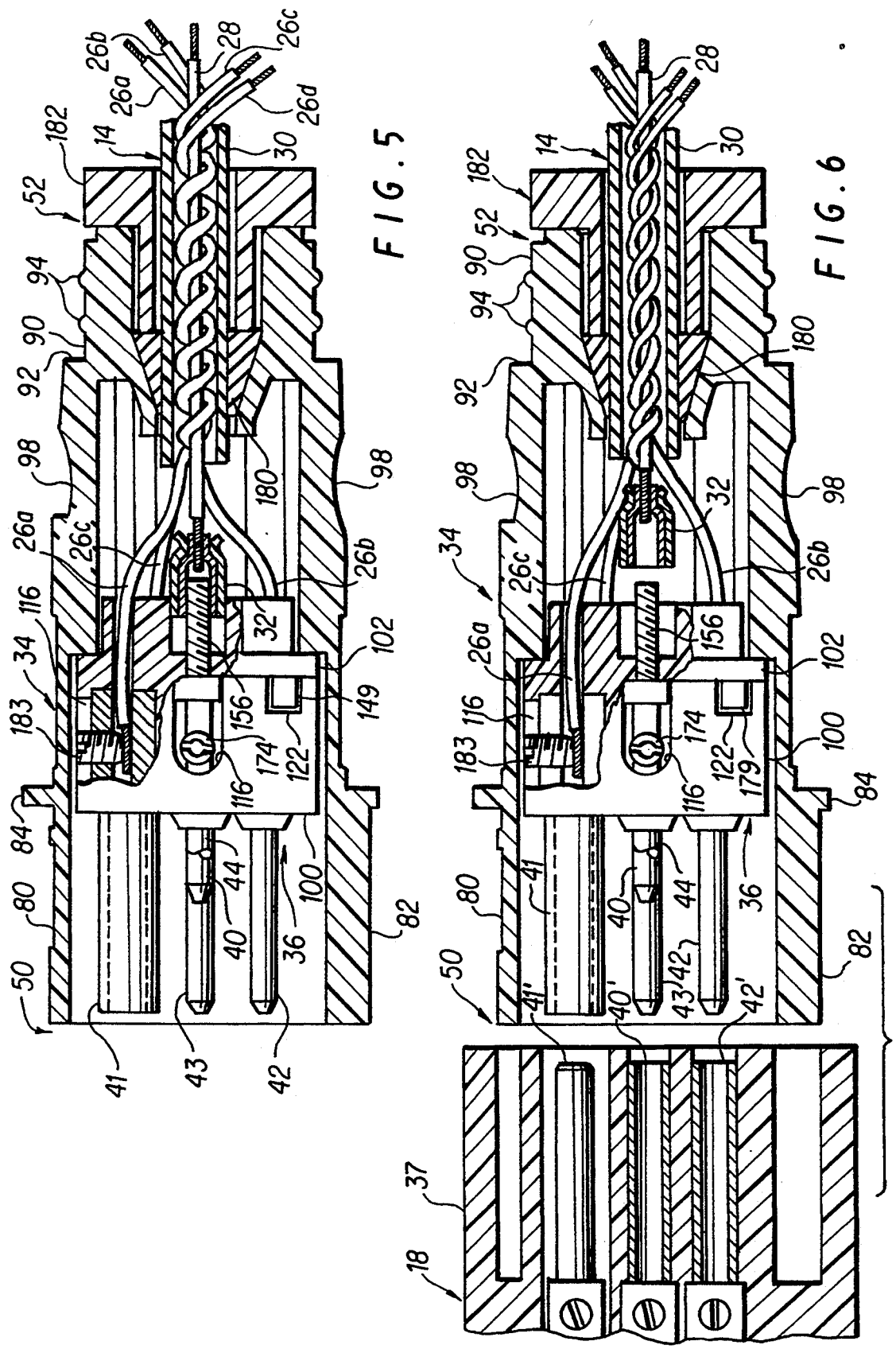

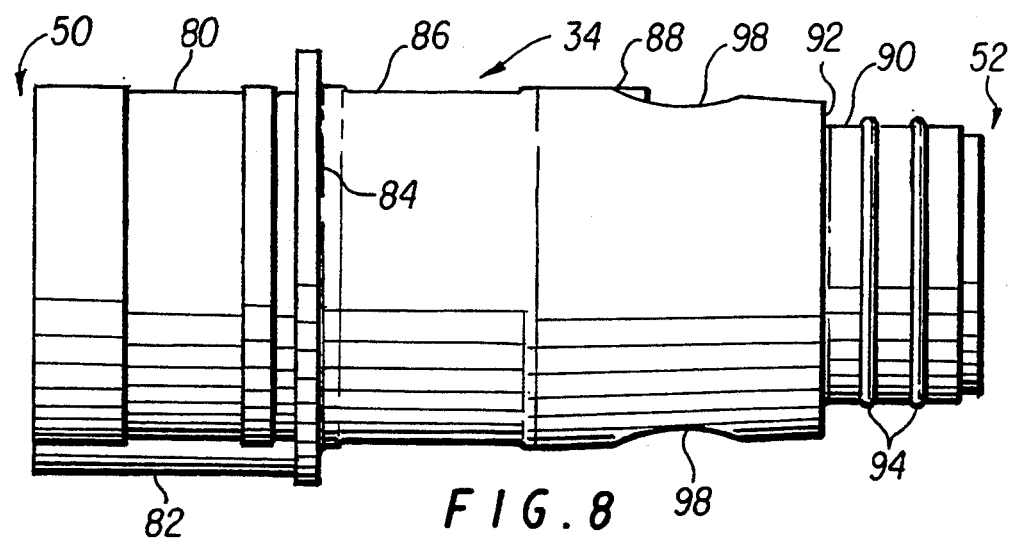
FIG. 8
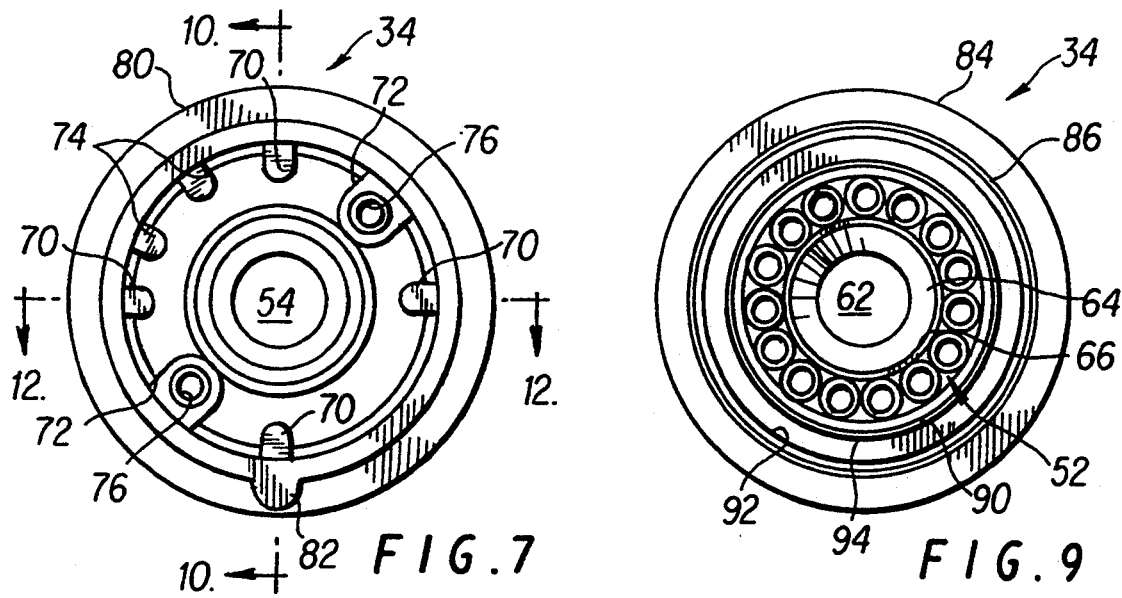
FIG. 7
FIG. 9
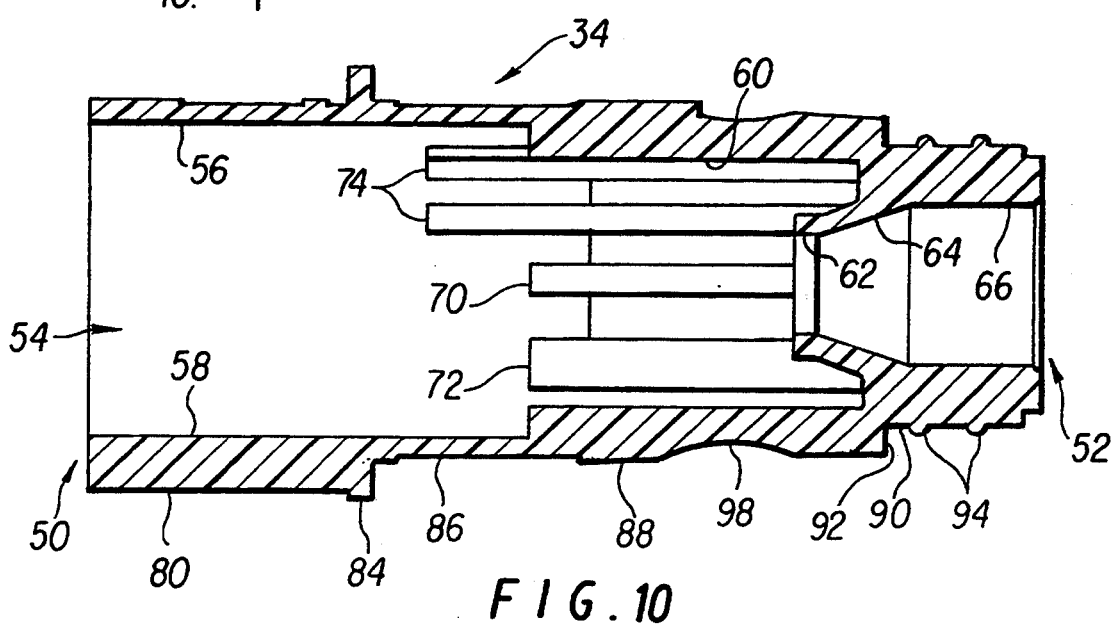
FIG. 10

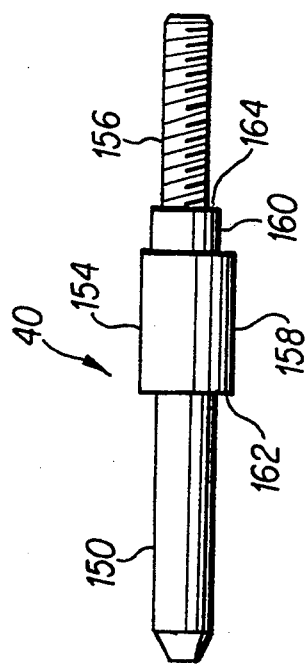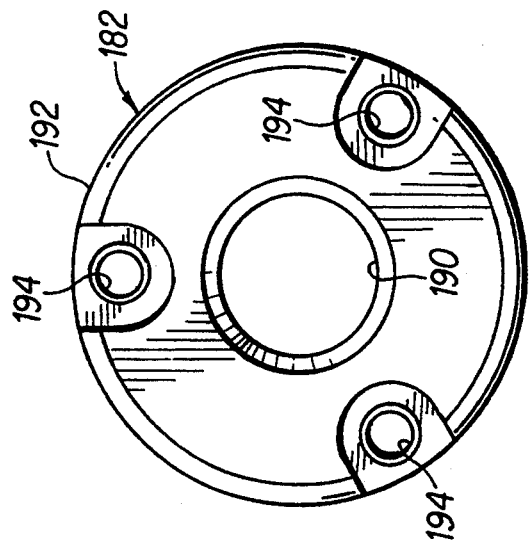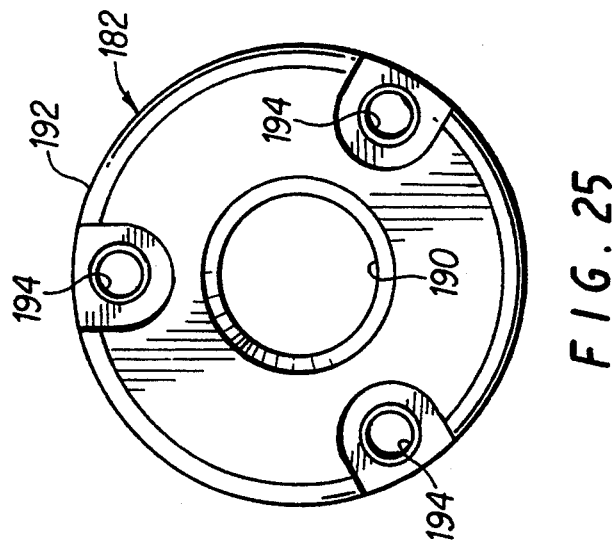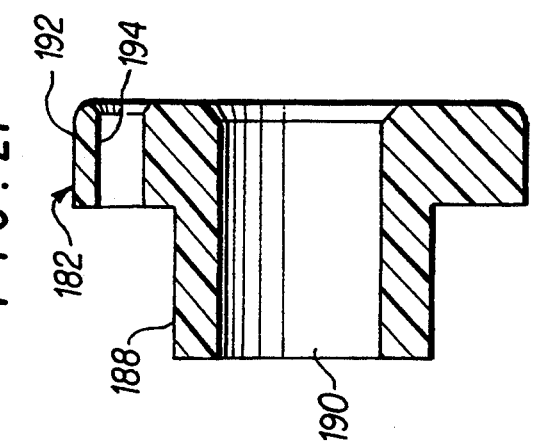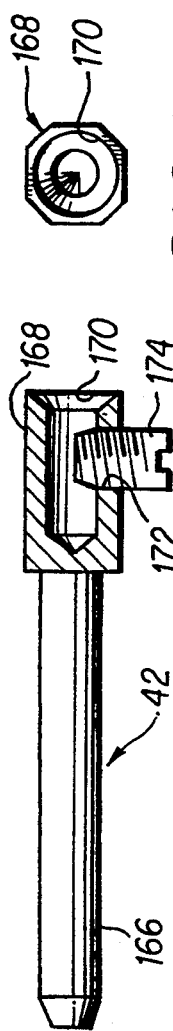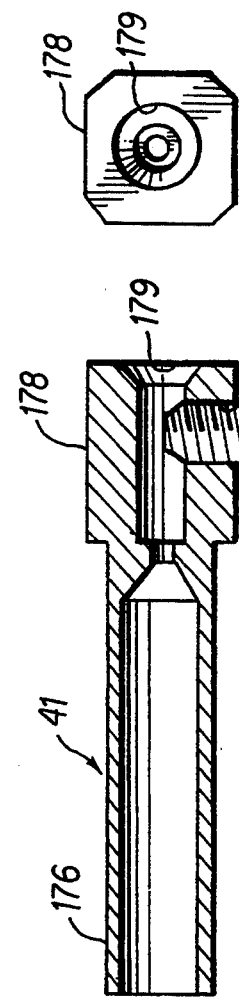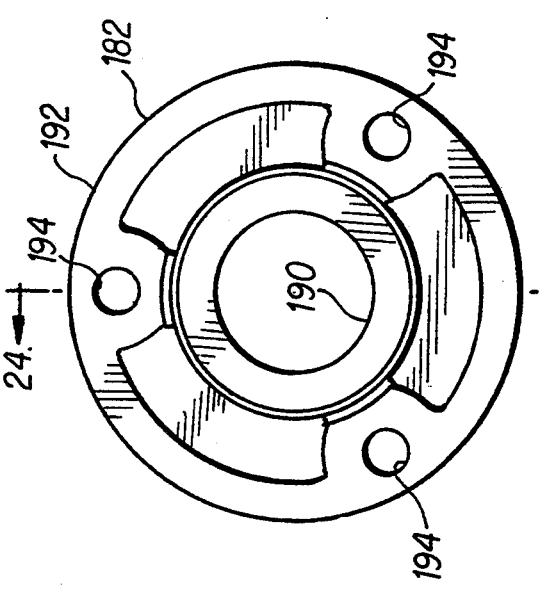

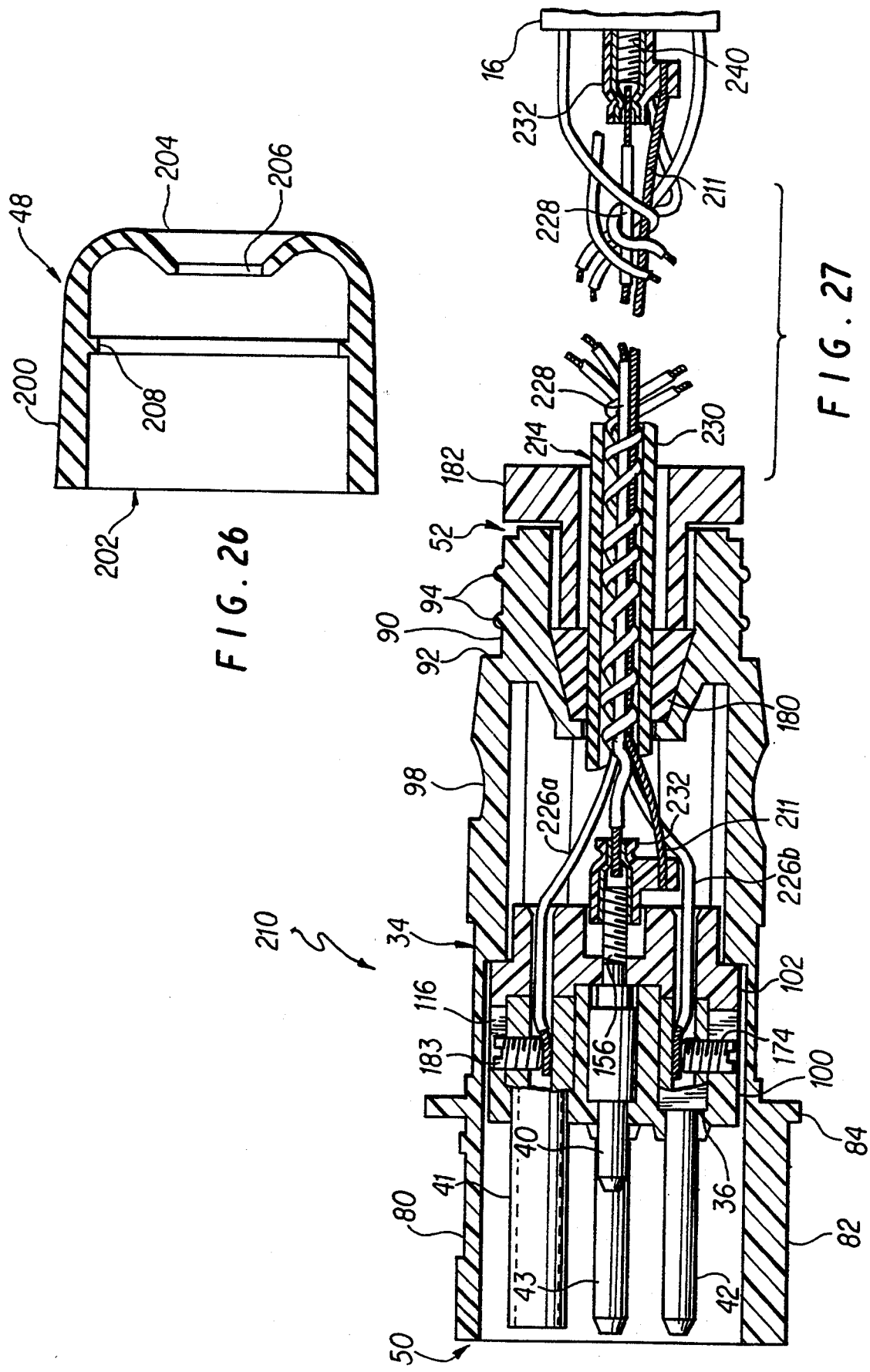

ELECTRICAL CABLE AND CONNECTOR ASSEMBLY WITH SAFETY PILOT LINE DISCONNECT, ESPECIALLY FOR ELECTRIC VEHICLE

FIELD OF THE INVENTION

This invention relates to an electrical cable and connector assembly having an electrical connector and an electrical cable with a plurality of power conductors, and a pilot conductor in which the pilot conductor is releasably coupled to the electrical contact of the connector to release from the contact of the connector when a sufficiently high mechanical stress or force is applied to the cable. Specifically, the pilot conductor releases prior to damage occurring to the power conductors. The pilot conductor can be connected to a circuit so that the power supplied to the cable is immediately interrupted upon the release or breakage of the pilot conductor from the electrical contact of the connector.

BACKGROUND OF THE INVENTION

The number of automobiles being operated is continuing to increase which has significantly increases the worldwide air pollution problem. This air pollution problem from automobiles has prompted many countries to regulate the exhaust emissions from automobiles. In fact, the exhaust emissions standards are constantly becoming stricter each year. For example, California regulators have recently passed a law requiring 2% of all vehicles sold in California to be "zero-emissions" or electric powered by 1998. Failure to meet the new emission standard would result in significant fines to automobile manufacturers selling automobiles in California. Accordingly, automobile manufacturers' ability to sell automobiles in California will be hurt if they do not produce an automobile with zero-emissions.

In view of these increasingly stricter emission requirements, automobile manufacturers are beginning to develop electric powered vehicles. Accordingly, it will be necessary to provide the owners of the electric vehicles with a safe and easy way of recharging their batteries. Moreover, electric vehicles have a limited range of travel before requiring their batteries to be recharged. Thus, recharging stations will be needed which are conveniently located and easy to operate in substantially the same manner in which gas stations are currently available for gas powered vehicles.

Currently, there are many methods of transferring power from a power source to a device, equipment vehicle, etc. The most common method is to use a pair of electrical connectors, i.e., a plug and receptacle. However, current electrical connectors do not provide a safety feature to prevent an electrical accident in the event of the electrical cable receiving a mechanical stress, such as if the vehicle is towed away from the recharging station, or struck by another vehicle, while the vehicle is still electrically coupled to the recharging station by the cable.

One example of an electric vehicle and a recharging station for recharging the batteries of electric vehicles is disclosed in U.S. Pat. No. 4,158,802 to Rose, II. The electric vehicle and the recharging station disclosed in the patent issued to Rose, II have many drawbacks. For instance, the contact surface of the vehicle is exposed to the environment which can cause the electrical contact surfaces of the vehicle to corrode. Also, the electrical contact surfaces of the vehicle and the recharging station are exposed to the driver such that the driver of the vehicle could accidentally touch one of the electric contacts and receive an electrical shock. Furthermore, this recharging station would require all electric vehicles to be manufactured within a certain range of sizes and shapes.

Examples of prior electrical cables utilizing a safety mechanism to prevent an electrical accident are disclosed in U.S. Pat. Nos. 554,263 to Guilleaume; 1,690,580 to Hedley et al, 1,947,503 to Shunk; 2,478,147 to Wilson; and 4,011,483 to Meadows.

In view of the above, it is apparent that there exists a need for an electrical cable and connector assembly for electrical equipment or systems such as electric vehicles and electrical recharging stations which will overcome the above problems of the prior art, and which are safe and convenient to operate. This invention addresses this need in the art along with other needs which will become apparent to those skilled in the art once given this disclosure.

SUMMARY OF THE INVENTION

A primary object of the present invention is to provide an electrical cable and connector assembly having an electrical connector coupled to a power source via a cable in which the power will be interrupted in the cable prior to damage to the high voltage conductors when an excessively high stress or force is applied to the cable.

Accordingly, another object of the present invention is to provide an electrical cable and connector assembly, especially for electric vehicles, which is safe and convenient to operate.

Another object of the present invention is to provide an electrical cable and connector assembly which is relatively inexpensive to manufacture.

Another object of the present invention is to provide an electrical cable and connector assembly which is relatively easy to repair in the event of an excessive stress or force being applied to the cable, causing the cable to break away from the connector.

The foregoing objects are basically attained by providing an electrical cable and connector assembly, the combination comprising: an electrical cable having at least a first electrical conductor and a second electrical conductor, the conductors having a first end and a second end; and an electrical connector having a housing, a first contact member, at least partially disposed within the housing, a first coupling member for releasably coupling the first conductor to the first contact member, and a second contact member at least partially disposed within the housing, a second coupling member for fixedly coupling the second conductor to the second contact member, the first and second contact members being fixedly coupled to the housing, the first conductor being releasably coupled to the first contact member by the first coupling member for disconnecting from the first contact member upon application of a longitudinal force transmitted along the cable, and the second conductor being fixedly coupled to the second contact member by the second coupling member so that the first conductor releases from the first contact member before damage occurs to the second conductor.

Other objects, advantages and salient features of the invention will become apparent from the following detailed description, which, taken in conjunction with the annexed drawings, discloses two preferred embodiments of the invention.

BRIEF DESCRIPTION OF THE DRAWINGS

Referring to the drawings which form a part of the original disclosure:

FIG. 1 is a partial, perspective view of an electrical cable and connector assembly in accordance with the present invention and illustrated in connection with an electric vehicle and an electric recharging station;

FIG. 2 is an enlarged elevational view of the electrical cable and connector assembly illustrated in FIG. 1;

FIG. 3 is a left end elevational view of the electrical cable and connector assembly illustrated in FIGS. 1 and 2;

FIG. 4 is an exploded, perspective view of the electrical cable and connector assembly illustrated in FIGS. 1-3;

FIG. 5 is a longitudinal cross-sectional view of the electrical cable and connector assembly illustrated in FIGS. 1-14 prior to a stress or force being applied to the cable;

FIG. 6 is a longitudinal cross-sectional view of a receptacle and the electrical cable and connector assembly illustrated in FIGS. 1-5 with a stress or force being applied on the cable, which caused the pilot conductor to disconnect;

FIG. 7 is a left end elevational view of the outer housing illustrated in FIGS. 1-6;

FIG. 8 is a side elevational view of the outer housing of the electrical cable and connector assembly illustrated in FIGS. 1-7;

FIG. 9 is a right end elevational view of the outer housing illustrated in FIGS. 7 and 8;

FIG. 10 is a longitudinal cross-sectional view of the outer housing illustrated in FIG. 7 taken along section line 10—10;

FIG. 18 is a side elevational view of one of the power contact pins of the electrical cable and connector assembly illustrated in FIGS. 1-6;

FIG. 19 is a right end elevational view of the power contact pin illustrated in FIG. 18;

FIG. 20 is a side elevational view of the ground contact sleeve of the electrical cable and connector assembly illustrated in FIGS. 1-6;

FIG. 21 is a right end elevational view of the ground contact sleeve illustrated in FIG. 21;

FIG. 22 is a side elevational view of the pilot pin of the electrical cable and connector assembly illustrated in FIGS. 1-6;

FIG. 23 is a left end elevational view of the end cap of the electrical cable and connector assembly illustrated in FIGS. 1-6;

FIG. 24 is a longitudinal cross-sectional view of the end cap illustrated in FIG. 23 taken along section line 24—24;

FIG. 25 is a right end elevational view of the end cap illustrated in FIGS. 23 and 24;

FIG. 26 is a longitudinal cross-sectional view of the end cushion or seal member of the electrical cable and connector assembly illustrated in FIGS. 1-6;

FIG. 27 is a longitudinal cross-sectional view of an electrical cable and connector assembly in accordance with a second embodiment of the present invention.

DETAILED DESCRIPTION OF THE DRAWINGS

Figure 11:
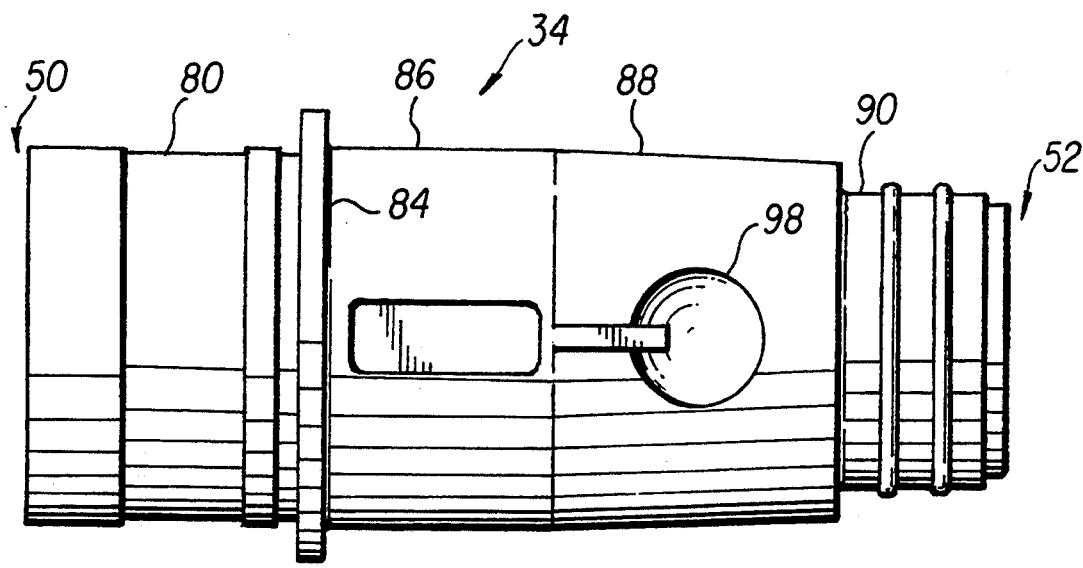
FIG. 11 is a side elevational view of the outer housing illustrated in FIGS. 7 and 8 after 90° of rotation.
Figure 12:
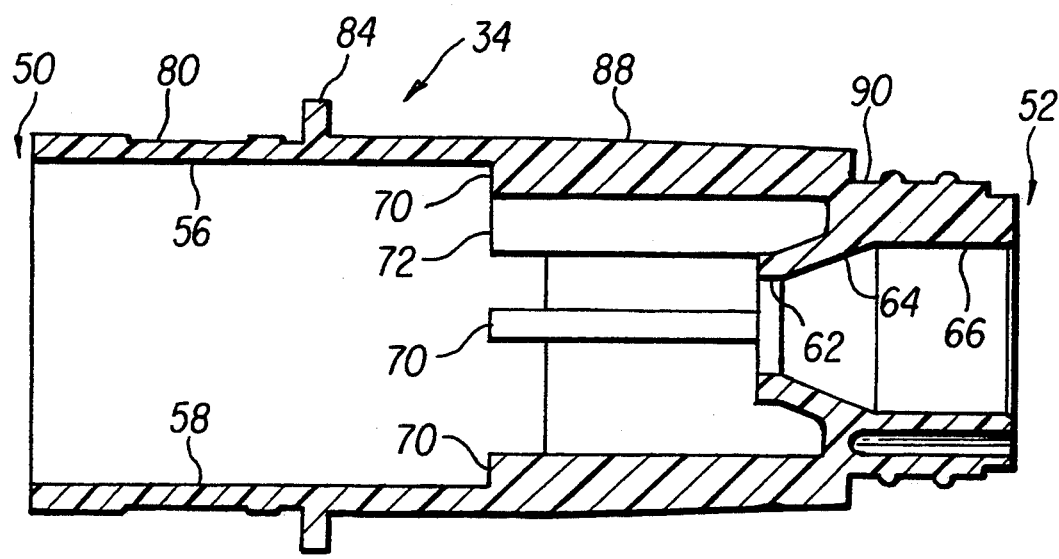
FIG. 12 is a longitudinal cross-sectional view of the outer housing illustrated in FIG. 7 taken along section line 12—12.
Figures 13, 14:
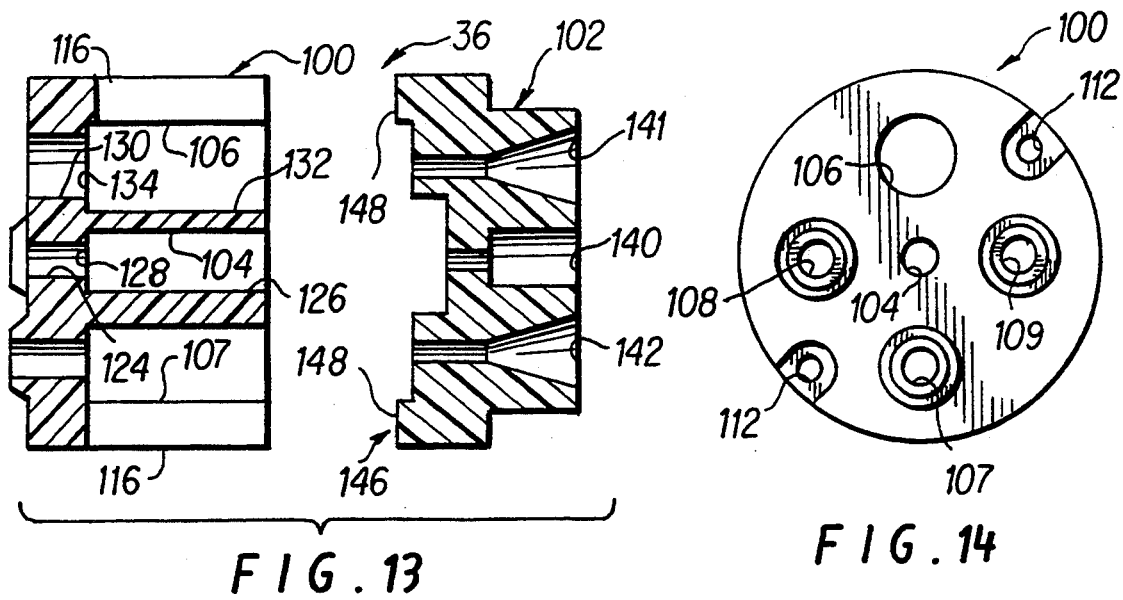
FIG. 13 is an exploded, longitudinal cross-sectional view of the contact housing of the electrical cable and connector assembly illustrated in FIGS. 1-6 with the contact members removed.
FIG. 14 is a left end elevational view of the contact retainer section of the contact housing illustrated in FIG. 13.
Figures 15, 16:
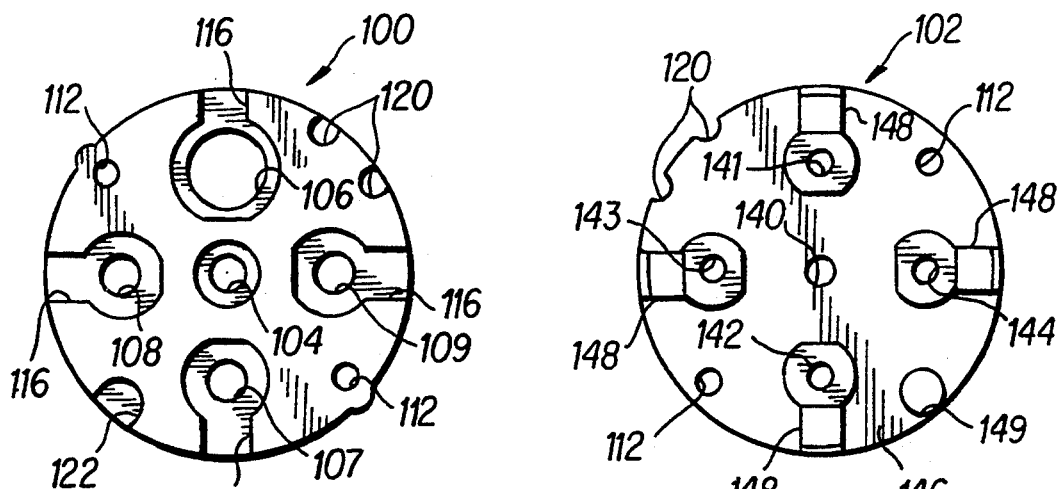
FIG. 15 is a right end elevational view of the contact retainer section of the contact housing illustrated in FIGS. 13 and 14.
FIG. 16 is a left end elevational view of the end section of the contact housing illustrated in FIG. 13.
Figure 17:
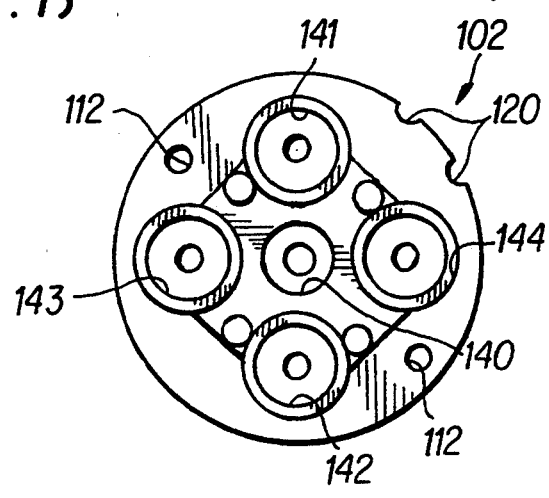
FIG. 17 is a right end elevational view of the end section of the contact housing illustrated in FIGS. 13 and 16.

Referring initially to FIG. 1, an electrical cable and connector assembly 10 is illustrated in accordance with the present invention, and includes a plug or male electrical connector 12 electrically coupled to an electrical and communication cable 14.

In the preferred application of electrical cable and connector assembly 10, cable 14 is electrically coupled at one end to connector 12 and at the other end to a power source or charging station 16 for dispersing electrical energy via electrical cable and connector assembly 10. Electrical connector 12 is then adapted to be coupled to a receptacle or female electrical connector 18 mounted in an electric vehicle 20 for receiving electrical energy from connector 12.

Vehicle 20 preferably has a battery 22 electrically coupled to receptacle 18 for receiving electrical energy therefrom, and an on-board microprocessor or computer 24 for transmitting and receiving relevant data to and from power source 16 to control the operation thereof. Of course, connector 12 with cable 14 could be mounted to vehicle 20 and connector 18 could be mounted to the power source or charging station 16.

While electrical cable and connector assembly 10 is illustrated in conjunction with an electric vehicle 20, it will become apparent from this disclosure that electrical cable and connector assembly 10 can be used in many other electrical systems and applications.

Power source or charging station 16 is preferably connected to the local electrical utility company's power line or to any other conventional source of electrical energy. Charging station 16 can be mounted in practically any location, including residential houses, apartment buildings, gas stations, parking garages, or even at the side of a curb so that power can be readily available to vehicle 20.

In residential applications, charging station 16 can be electrically connected in a conventional manner to a circuit breaker panel or power meter in a residential home or apartment. Electrical connections, breaker panel, and/or power meter are all conventional and well known, and thus they will not be discussed or illustrated in detail herein.

In commercial applications, charging station 16 can be constructed to use similar electronics as used in today's automated gas stations. For example, charging station 16 can be provided with a conventional power meter for determining the amount of electrical energy dispensed, a credit or debit card slot for payment of the dispensed electrical energy, and any other of the similar types of conveniences provided at automated gas stations. The electronics and circuits which can be used for operating charging station 16 in commercial applications are conventional and well known, i.e., similar electrical circuits are currently used to operate gas station pumps, and thus the electronics and circuits for charging station 16 will not be discussed or illustrated in detail herein.

Likewise, electric vehicle 20 with battery 22 and microprocessor 24 are all conventional and well known, and thus they will not be discussed or illustrated in detail.

As seen in FIGS. 5 and 6, cable 14 preferably includes four spirally wrapped electrical power conductors 26a–26d, a centrally located pilot or communication conductor 28 and an insulating jacket 30 covering conductors 26a–26d and 28. Power conductors 26a–26d are all substantially identical to each other, except that conductor 26a is a ground, conductor 26b is the neutral line and the other two conductors 26c and 26d are current carrying-conductors.

Conductors 26a–26d and 28 are coupled at one of their ends to connector 12 and at the other of their ends to power source 16. Specifically, power conductors 26a–26d are fixedly coupled at their ends to connector 12 and power source 16 so that power conductors 26a–26d will not break away or disconnect from connector 12 and power source 16 until about 350 pounds of force is applied to cable 14. Pilot conductor 28, on the other hand, is releasably coupled at least at one end to connector 12 by a crimp connector 32 so that pilot conductor 28 will release or disconnect from the electrical contact of connector 12 upon application of about 100 to about 200 pounds of force being applied to cable 14. Accordingly, pilot conductor 28 will release from the contact of connector 12 before damage occurs to the power conductors 26a–26d upon application of an excessively high stress or force being applied to cable 14.

Preferably, pilot conductor 28 is electrically coupled to a circuit (not shown) which interrupts the power supplied to the cable upon release of pilot conductor 28 from the contact of electrical connector 12. Thus, the interruption of the pilot line circuit provides a fail-safe means to detect the excessive cable force and can be used to activate a conductor or perform many other safety features.

The conductive core of pilot conductor 28 is preferably constructed of a material of a high modulus which does not stretch. Also, pilot conductor 28 is coupled at its ends to connector 12 and power source 16 so that little or no slack exists in pilot conductor 28 between connector 12 and power source 16. Power conductors 26a–26d, on the other hand, are helically or spirally twisted around the centrally located pilot conductor 28 in a loose manner. Thus, power conductors 26a–26d are longer in length than the centrally located pilot conductor 28 so that the force applied to cable 14 places pilot conductor 28 under a higher amount of tension than power conductors 26a–26d.

In other words, as seen in FIGS. 5 and 6, the helically twisted power conductors 26a–26d will move inwardly to assume a shallow helix angle to take up the clearances between the power conductors 26a–26d to remain in low tension upon application of a tension force to cable, while centrally located pilot conductor 28 will be placed under higher tension and will be pulled off its contact of connector 12 before all of the slack in the power conductors 26a–26d is taken up.

Preferably, each of the power conductors 26a–26d are preformed to provide a spring action effect similar to the spiral cords used on telephone receivers. Accordingly, the result of this arrangement is that as the tension rises in the pilot conductor 28, the tension in the helical power conductors 26a–26d remains significantly lower because the power conductors 26a–26d can move axially within jacket 30 of cable 14.

Each of the conductors 26a–26d and 28 are conventional conductors with a conductive core and an insulating sheath covering the core. Accordingly, conductors, such as conductors 26a–26d and 28, are well known, and thus will not be discussed or illustrated in detail herein.

Connector 12 includes an insulating outer housing 34 for receiving one end of electrical cable 14 therein, a contact housing 36 rigidly coupled to outer housing 34 by a pair of screws 38, a central pilot contact member 40 fixedly coupled to contact housing 36, four circumferentially spaced power contact members 41–44 fixedly coupled to contact housing 36, and a cable strain relief assembly 46 fixedly coupled to outer housing 34 for limiting axial movement of cable 14 within outer housing 34, and an end cushion or sealing member 48 fixedly coupled to outer housing 34 and engaging cable 14.

Power conductors 26a–26d are fixedly coupled to power contact members 41–44 in a conventional manner as discussed below. Pilot conductor 28 is preferably releasably coupled to central pilot contact member 40 by friction. Thus, pilot conductor 28 is preferably frictionally coupled to central pilot contact member 40 as seen in FIG. 27.

As seen in FIGS. 1 and 6, female (receptacle) connector 18 is adapted to receive male (plug) connector 12 within its insulated housing 37 so that contact members 40–44 of connector 12 electrically engage contact members 40'–44' of connector 18.

As seen in FIGS. 1, 3 and 6, male (plug) connector 12 and receptacle 18 have their contact members 41–44 and 41'–44', respectively, arranged around the circumference of a circle which is centered about the pilot contact members 40 and 40' of connector 14 and receptacle 18. Also, the contact members 41 and 41', i.e., the ground contacts, have a sleeve shaped contact on the male (plug) connector 12 and a pin on the female (receptacle) connector 18. Preferably, power contact members 41–44 of male (plug) connector 12 extend farther out of contact housing 36 than pilot contact member 40 so that power contact members 41–44 will contact their corresponding power contact members 41'–44' of female (receptacle) connector 18 before pilot contact member 40 contacts pilot contact member 40' of receptacle 18. Thus, pilot contact members 40 and 40' will disconnect before power contact members 41–44 of connector disconnect from power contact members 41'–44' of receptacle 18. Of course, contact members 41–44 of connector 12 and contact member 41'–44' can be switched.

Referring now to FIGS. 7-12, outer housing 34 has a first open end 50 and a second open end 52 with a longitudinally extending passageway 54 extending between first open end 50 and second open end 52 for receiving a portion of cable 14 and contact housing 36 therein. Outer housing 34 is preferably a tubular, substantially cylindrical member constructed out of a hard, rigid plastic material such as that sold under the trademark VALOX 357.

Passageway 54 forms a substantially cylindrical tubular inner surface 56 having a first cylindrical portion 58 adjacent first open end 50, a first frustoconical portion 60 extending from first cylindrical portion 58 inwardly toward the longitudinal axis of outer housing 34 as first frustoconical portion 60 approaches second open end 52, a second cylindrical portion 62 concentrically arranged within first frustoconical portion 60, a second frustoconical portion 64 extending from second cylindrical portion 62 to the smaller diameter end of first frustoconical portion 60, and a third cylindrical portion 66 extending between the larger diameter end of second frustoconical portion 64 and second open end 52.

First cylindrical portion 58 is preferably a substantially smooth cylindrical surface having a diameter slightly larger than the diameter of contact housing 36 for receiving contact housing 36 therein as discussed below in more detail.

Referring now to FIGS. 5-7, 10 and 12, first frustoconical portion 60 receives a portion of cable 14 therein, and includes four longitudinally extending supporting bosses or ribs 70, a pair of longitudinally extending mounting bosses or ribs 72, and a pair of longitudinally extending positioning keys or ribs 74 positioned between a pair of the supporting bosses 70. The supporting bosses 70 are equally spaced 90° apart about the circumference of first frustoconical portion 60, while mounting bosses 72 are spaced 180° apart. Each of the mounting bosses 72 includes a threaded hole 76 for threadedly receiving one of the screws 38 to fixedly secure contact housing 36 within first cylindrical portion 58 of outer housing 34.

Preferably, supporting bosses 70, mounting bosses 72, and positioning keys 74 all extend along the entire length of first frustoconical portion 60 and extend partially along a part of first cylindrical portion 58. Supporting bosses 70 and mounting bosses 72 all preferably terminate at the same point along first cylindrical portion 58 to engage contact housing 36. Positioning keys 74 extend longitudinally farther than supporting ribs 70 or mounting bosses 72 towards first open end 50 so that positioning keys 74 will engage a portion of contact housing 36 to ensure correct orientation of contact housing 36 within outer housing 34.

The external surface of outer housing 34 preferably has a first substantially cylindrical portion 80 adjacent first open end 50 with a longitudinally extending key or rib 82, an annular flange 84 spaced between first open end 50 and second open end 52, a second substantially cylindrical portion 86 extending from annular flange 84 towards second open end 52, a substantially frustoconical portion 88 extending from second cylindrical portion 86 towards second open end 52, and a third substantially cylindrical portion 90 extending from the smaller diameter end of frustoconical portion 88 and forming an annular shoulder 92 therebetween.

First cylindrical portion 80 with key 82 is sized to be received within a recess within receptacle 18. Key 82 ensures proper orientation of connector 12 for insertion into receptacle 18 so that the contacts of connector 12 will not touch the contacts of receptacle 18 unless the connector 12 is correctly oriented. Annular flange 84 limits longitudinal movement of connector 12 into receptacle 18.

Frustoconical portion 86 includes a pair of gripping indentations 98 spaced 180° apart for assisting in the insertion of connector 12 into receptacle 18.

Third cylindrical portion 90 is provided with one or more annular ridges 94 for retaining cushion or sealing member 48 thereon.

Referring now to FIGS. 13-17, contact housing 36 is substantially cylindrical in transverse cross section, and has a diameter slightly smaller than first cylindrical portion 58 of outer housing 34 for being received therein. Preferably, contact housing 36 is constructed of a hard, rigid plastic material with contact members 40-44 fixedly coupled thereto. Contact housing 36 includes a first cylindrical contact retainer section 100, and a second cylindrical end section 102. Retainer section 100 and end section 102 are fixedly coupled together by any suitable fastening means such as an adhesive.

As seen in FIGS. 4 and 13-15, contact retainer section 100 has a centrally located pilot bore 104 for receiving pilot contact member 40 therein, four power contact bores 106-109 for receiving power contact members 41-44 therein, two longitudinally extending fastening holes 112 for receiving screws 38 therethrough, four radially extending terminal windows 116 communicating with contact bores 106-109, a pair of key or positioning slots 120 extending longitudinally along a portion of the side of contact retainer section 100 for receiving positioning keys 74 of outer housing 34 therein, and a key cutout 122 for receiving a portion of end section 102 to ensure proper alignment of end section 102 with retainer section 100.

Pilot bore 104 includes a first cylindrical portion 124 and a second cylindrical portion 126 connected to first cylindrical portion 124 by an axially facing abutment shoulder 128. Similarly, bores 106-109 each includes a first cylindrical portion 130 and a second cylindrical portion 132 coupled to first cylindrical portion 130 by an axially facing abutment shoulder 134. Second cylindrical portions 132 are shaped to prevent rotation of the respective power contact men,bet 41-44 when received therein.

As seen in FIGS. 5, 6, 13, 16 and 17, end section 102 is preferably a disk shaped member having a centrally located pilot bore 140 for receiving a portion of pilot contact member 40 therethrough, and four conductor bores 141-144 for receiving a portion of power conductors 26a-26d therethrough. The axially extending face 146 of end section 102 preferably has four positioning blocks 148 centered about conductor bores 141-144 for being received within second cylindrical portions 132 to prevent relative rotation of end section 102 relative to retainer section 100 and a key pin 149 which is received in key cutout 122 of retainer section 100 to ensure proper alignment with the correct conductor bore 141-144 with the correct contact member 41-44.

Referring to FIG. 22, pilot contact member 40 is made of a conductive material such as brass or nickel plated brass. Pilot contact member 40 is preferably a contact pin having a first cylindrical contact portion 150 at one end, a cylindrical retaining body portion 154, and a second cylindrical contact portion 156 for releasably receiving connector 32 of pilot conductor 28 thereon. Preferably, second contact portion 156 is threaded or grooved to increase the friction between second contact portion 156 and connector 32 to prevent separation therebetween until approximately 100 pounds to 200 pounds of strength or force is applied to cable 14.

Preferably, retaining body 154 has a first cylindrical section 158 and a second cylindrical section 160 with remote ends following annular shoulders 162 and 164 respectively for engaging shoulder 128 of retainer section 100 and the axially extending face of end section 102 to prevent axial movement of pilot contact member 40 within contact housing 36.

Referring to FIGS. 18 and 19, power contact members 42–44 are all constructed of a conductive material such as brass. Power contact members 42–44 are all substantially identical, and thus only power contact member 42 will be discussed in detail herein. Power contact member 42 is preferably a contact pin having a cylindrical contact portion 166 and a terminal portion 168. Terminal portion 168 includes a longitudinally extending bore 170 for receiving one end of the conductive core of conductor 26b, a transverse extending threaded bore 172 for receiving a thumb screw 174 for fixedly coupling an electrically coupling conductive core of wire 26b thereto. Preferably, terminal portion 168 has an octagonal shaped, transverse cross section, and is non-rotatably received in bore 106 so that threaded bore 172 with thumb screw 174 is positioned within window 116.

Referring to FIGS. 20 and 21, power contact member 41, i.e., the ground contact, is constructed of a conductive material such as brass. Power contact member 41 has a sleeve shaped contact portion 176 and a terminal portion 178 with a transverse rectangular cross section. Terminal portion 178 has an axially extending bore 179 for receiving one end of the conductive core of conductor 26a and a transverse extending threaded bore 181 for receiving a thumb screw 183 for fixedly securing an electrically coupling conductor 26a thereto.

Referring to FIGS. 4 and 23–25, cable strain relief assembly 46 includes an elastomeric gland or grommet member 180, an end cap 182 and three screws 184 for fixedly coupling gland member 180 and end cap 182 to second open end 52 of outer housing 34.

As seen in FIGS. 4–6, gland or grommet member 180 is preferably constructed of a neoprene material having a durometer of about 35 to about 45. Gland member 180 is substantially tubular with a central bore 186 having a diameter slightly larger than the diameter of cable 14 for slidably receiving cable 14 therein in its uncompressed state. The outer diameter of gland member 180 is preferably slightly smaller than third cylindrical portion 66 of passageway 54 of outer housing 34 for receiving gland member 180 therein.

Referring now to FIGS. 23–25, end cap 182 includes a cylindrical sleeve 188 with an axially extending bore 190 for receiving cable 14 therethrough, and a disk shaped end member 192 integrally formed with sleeve 188. Preferably, end cap 182 is made of a hard, rigid plastic material such as that sold under the trademark VALOX 357.

Sleeve 188 has an inner diameter slightly larger than the diameter of cable 14 and an outer diameter slightly smaller than third cylindrical portions 66 of outer housing 34 for being received therein. Specifically, sleeve 188 engages and compresses gland member 180 against second frustoconical portion 64, causing gland member 180 to frictionally engage the outer surface of cable 14 to limit axial movement of the portion of cable 14 within outer housing 34. Specifically, this compression of gland member 180 prevents axial movement of cable 14 relative to outer housing 34 until an axial force or stress is placed on cable 14 in the range of about 100 pounds to about 350 pounds.

Disk 192 has three longitudinally extending bores 194 equally spaced 120° apart circumferentially about disk 192 for receiving screws 184 therethrough. In particular, screws 184 extend through bores 194, and are threaded into three of the bores 198 of the end surface of second open end 52 of outer housing 34 for fixedly coupling cable strain relief assembly 46 to outer housing 34.

As seen in FIG. 26, cushion or sealing member 48 is constructed of an elastomeric material such as neoprene or rubber, and incudes a frustoconical side wall 200, an open end 202, an end wall 204 with an opening 206, and an annular flange 208 extending from the inner surface of wall 200. Opening 206 is sized slightly smaller than the diameter of cable 14 for providing a seal therebetween. The inner diameter of wall 200 is sized slightly smaller than the diameter of third cylindrical portion 90 to frictionally engage ridges 94. Annular flange 208 also engages one of the ridges 94 to provide a proper seal therebetween.

Assembly of Electrical Cable and Conductor Assembly 10

To assemble electrical connector 12 to cable 14, first end cushion 48, end cap 182, gland member 180 and outer housing 34 are all slid onto electrical cable 14, then contact housing 36 with contact members 40–44 retained therein are connected to pilot conductor 28 and power conductors 26a–26d, respectively. Specifically, connector 32 of pilot conductor 28 is slid onto second contact portion 152, while conductors 26a–26d are fixedly coupled to contact members 41–44 by inserting the conductive core into bores 179 and 181 and threading thumb screws 174 and 183.

Next, contact housing 36 is fixedly secured within first cylindrical portion 56 of outer housing 34 via threading screws 38 into threaded openings 76 of mounting bosses 72 of outer housing 34. Positioning keys 74 engage positioning slots 120 to ensure proper orientation of contact housing 36 within outer housing 34.

Now, gland member 180 is pushed into third cylindrical portion 66 of outer housing 34 until it abuts against second frustoconical portion 74. Then, the end cap 182 is secured to second open end 52 of outer housing 34 via screws 184 being threaded into bores 198. This causes sleeve 188 to compress gland member 180, causing gland member 180 to frictionally grip cable 14. Finally, cushion or sealing member 48 is slid over end cap 182 to overlie third cylindrical portion 90 and retained thereon by annular ridges 94.

In the event an excessively high force is applied to cable 12, the force is transmitted to conductors 26a–26d and 28, since they are coupled at one of their ends to connector 12 and at the other of their ends to power source 16. Specifically, power conductors 26a–26d are fixedly coupled at their ends to connector 12 and power source 16 so that power conductors 26a–26d will not break away or disconnect from connector 12 and power source 16 until about 350 pounds of force is applied to cable 14. Pilot conductor 28, on the other hand, is releasably coupled at least at one end to connector 12 by a crimp connector 32 so that pilot conductor 28 will release or disconnect from the electrical contact of connector 12 upon application of about 100 to about 200 pounds of force being applied to cable 14. Accordingly, pilot conductor 28 will release from the contact of connector 12 before damage occurs to the power conductors 26a-26d upon application of an excessively high stress or force being applied to cable 14.

Preferably, pilot conductor 28 is electrically coupled to a circuit (not shogun) which interrupts the power supplied to the cable upon release of pilot conductor 28 from the contact of electrical connector 12. Thus, the interruption of the pilot line circuit provides a fail-safe means to detect the excessive cable force and can be used to activate a conductor or perform many other safety features.

Electrical Cable and Connector Assembly 210

Referring now to FIG. 27, an electrical cable and conductor assembly 210 in accordance with a second embodiment of the present invention is illustrated. This embodiment is substantially identical to electrical cable and connector assembly 10 illustrated in FIGS. 1–26, except that cable 14 has been replaced with a cable 214 having a non-conducting line or wire 211 coupled to the ends of the pilot conductor 228 for relieving the stress on pilot conductor 228 from a force applied to cable 214. Accordingly, electrical cable and connector assembly 210 will not be discussed or illustrated in detail herein except for the differences between the cable 14 of the first embodiment and cable 214 of the second embodiment.

As seen in FIG. 27, non-conducting line 211 is fixedly connected at both ends of pilot conductor 228. Preferably, the length of non-conducting line 211 is slightly longer than the length of pilot conductor 228 so that any stress or force transmitted to cable 214 will be first transmitted to non-conducting line 211 which will cause pilot conductor to disconnect with little or no stress being applied to either the pilot conductor 228 or the power conductors 226. However, non-conducting line 211 can be the same length as pilot conductor 228, if desired. In fact, non-conducting line 211 can be contained in an insulating jacket with pilot conductor 228. Non-conducting line 211 is constructed of a strong flexible material having low elongation such as piano wire or a Kevlar wire.

The ends of non-conducting line 211 are fixedly coupled to the ends of pilot conductor 228 by crimp connectors 232 which are in turn releasably coupled to pilot pin 40 of connector 12 and pilot pin 240 of power source 16. Accordingly, when an excessively high force is applied to cable 214, the force will be transmitted to non-conducting line 211 causing at least one of the connectors 32 to release from its respective pilot pin 40 or 240.

It will be apparent to those skilled in the art once given this disclosure that connectors 232 can be male connectors and pilot pins 40 and 240 can have female connecting ends.

Electrical Cable and Connector Assembly 310

Figure 28:
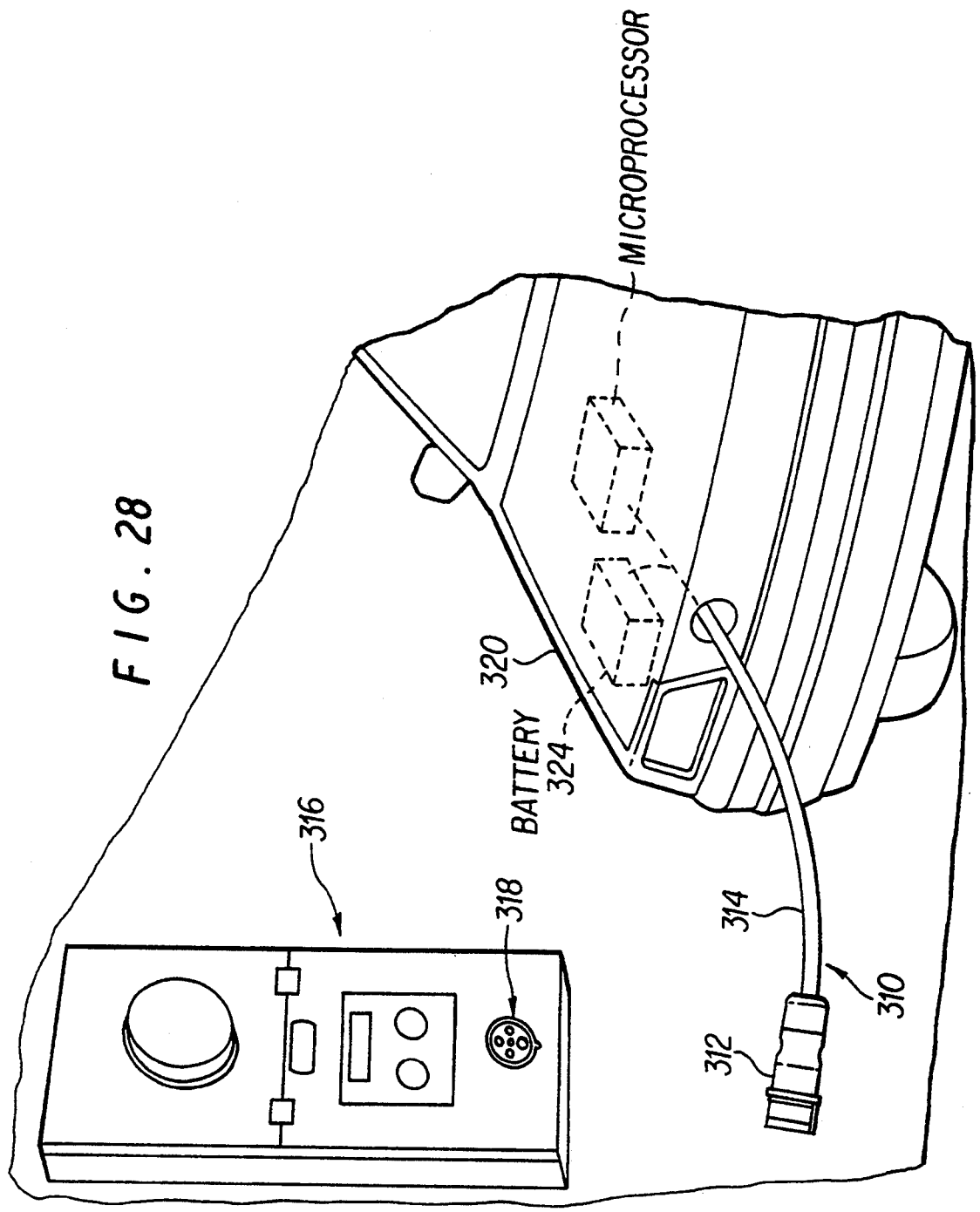
FIG. 28 is a partial, perspective view of an electrical cable and connector assembly in accordance with a third embodiment of the present invention and illustrated in connection with an electric vehicle and a recharging station.

Referring now to FIG. 28, an electrical cable and conductor assembly 310 in accordance with a third embodiment of the present invention is illustrated. This embodiment is substantially identical to electrical cable and connector assembly 10 illustrated in FIGS. 1–26, except that cable 314 has been electrically coupled to battery 322 on-board microprocessor or computer 322 of vehicle 320, and the receptacle 318 has been mounted in the electrical charging station 316. Accordingly, electrical cable and conductor assembly 310 will not be discussed or illustrated in detail herein.

While only two embodiments have been chosen to illustrate the present invention, it will be apparent by those skilled in the art that various changes and modifications can be made herein without departing from the scope of the invention as defined in the appended claims.

What is claimed is:

1. An electrical cable and connector assembly adapted to be coupled to an electrical device, the combination comprising:

an electrical cable having at least a first electrical conductor and a second electrical conductor, said conductors having a first end and a second end; and an electrical connector having a housing, a first contact member fixedly coupled to said housing, a first coupling member for coupling said first end of said first conductor to said first contact member at a first connection point within said housing, a second contact member fixedly coupled to said housing, and a second coupling member for fixedly coupling said first end of said second conductor to said second contact member at a second connection point within said housing, said second ends of said first and second conductors being coupled to the electrical device housing at a third connection point by a third coupling member and a fourth connection point by a fourth coupling member, respectively, said first conductor having a first length extending between said second connection point of said second conductor and said fourth connection point of said second conductor, said second conductor having a second length extending between said second and fourth connection points of said second conductor, said first length of said first conductor being shorter than said second length of said second conductor between said second and fourth connection points such that a longitudinal tensile force applied to said cable is first transmitted to said first conductor due to its shorter length between said second and fourth connection point, said first conductor being releasably coupled between said first contact member and the electrical device by one of said first and second coupling member for disconnecting electricity between said first contact member and the electrical device upon application of the longitudinal tensile force being transmitted along said cable so that one of said first and second ends of said first conductor releases before damage occurs to said second conductor.

2. An electrical cable and connector assembly adapted to be coupled to an electrical device, the combination comprising:

an electrical cable having at least a first electrical conductor and a second electrical conductor, said conductors having a first end and a second end, said second conductor being helically wrapped around said first conductor; and an electrical connector having a housing, a first contact member fixedly coupled to said housing, first coupling means for releasably coupling said first end of said first conductor to said first contact member, a second contact member fixedly coupled to said housing, and second coupling means for fixedly coupling said first end of said second conductor to said second contact member, said second ends of said first and second conductors being coupled to the electrical device housing, said first conductor being releasably coupled to said first contact member by said first coupling means for disconnecting from said first contact member upon application of a longitudinal force transmitted along said cable, and said second conductor being fixedly coupled to said second contact member by said second coupling means so that said first conductor release from said first contact member before damage occurs to said second conductor.

3. An electrical cable and connector assembly according to claim 2, wherein
said second conductor is preformed resilient wire with a spring action.

4. An electrical cable and connector assembly according to claim 3, wherein
said first coupling member includes a connector which is frictionally retained on said first contact member until an excessively high axially extending force is applied to said first conductor.

5. An electrical cable and connector assembly according to claim 4, wherein
said connector is a female connector and said first contact member is a pin.

6. An electrical cable and connector assembly according to claim 5, wherein
said pin has ridges.

7. An electrical cable and connector assembly according to claim 6, wherein
said ridges are threads formed on said pin.

8. An electrical cable and connector assembly according to claim 2, wherein
said cable further includes a third electrical conductor with first and second ends, and a fourth electrical conductor with first and second ends, said third and fourth conductors being helically wrapped around said first conductor; and
said electrical connector further includes a third contact member fixedly coupled to said housing, a fifth coupling member for fixedly coupling said first end of said third conductor to said third contact member, a fourth contact member fixedly coupled to said housing, and a sixth coupling member for fixedly coupling said first end of said fourth conductor to said fourth contact member.

9. An electrical cable and connector assembly according to claim 8, wherein
said second, third and fourth contact members extend farther out of said housing than said first contact member.

10. An electrical cable and connector assembly according to claim 9, wherein
said second, third and fourth contact members are circumferentially arranged around said first contact member.

11. An electrical cable and connector assembly according to claim 10, wherein
one of said second, third and fourth contact meanders is a sleeve shaped contact for receiving a pin contact, while said third and fourth contact members are solid pins for being received in sleeve shaped contacts.

12. An electric vehicle, comprising:
a battery for receiving electrical energy;
an electrical cable having one end electrically coupled to said battery, said cable having at least a first electrical conductor and a second electrical conductor, each of said conductors having a first end and a second end with said first ends of said electrical conductors being coupled to said vehicle; and
an electrical connector coupled to the other end of said cable, and having a housing, a first contact member fixedly coupled to said housing, first coupling means for releasably coupling said second end of said first conductor to said first contact member at a first connection point, a second contact member fixedly coupled to said housing, and second coupling means for fixedly coupling said second end of said second conductor to said second contact member at a second connection point,
said first conductor having a first length extending between said vehicle and said second connection point of said second conductor, said second conductor having a second length extending between said vehicle and said second connection point of said second conductor, said first length of said first conductor being shorter than said second length of said second conductor between said vehicle and said second connection point such that a longitudinal tensile force applied to said cable is first transmitted to said first conductor due to its shorter length between said vehicle and said second connection point, said first conductor being releasably coupled to said first contact member by said first coupling means for disconnecting from said first contact member upon application of a longitudinal force transmitted along said cable, and said second conductor being fixedly coupled to said second contact member by said second coupling means so that said first conductor releases from said first contact member before damage occurs to said second conductor.

13. An electric vehicle, comprising:
a battery for receiving electrical energy;
an electrical cable having one end coupled to said battery, and having at least a first electrical conductor and a second electrical conductor, each of said conductors having a first end and a second end, said second conductor being helically wrapped around said first conductor; and
an electrical connector coupled to the other end of said cable, and having a housing, a first contact member fixedly coupled to said housing, first coupling means for releasably coupling said first conductor to said first contact member, a second contact member fixedly coupled to said housing, and second coupling means for fixedly coupling said second conductor to said second contact member,
said first conductor being releasably coupled to said first contact member by said first coupling means for disconnecting from said first contact member upon application of a longitudinal force transmitted along said cable, and said second conductor being fixedly coupled to said second contact member by said second coupling means so that said first conductor releases from said first contact member before damage occurs to said second conductor.

14. An electric vehicle according to claim 13, wherein
said second conductor is preformed resilient wire with a spring action.

15. An electric vehicle according to claim 14, wherein said first coupling means includes a connector which is frictionally retained on said first contact member until an excessively high axially extending force is applied to said first conductor.

16. An electric vehicle according to claim 15, wherein
said connector is a female connector and said first contact member is a pin.

17. An electric vehicle according to claim 13, wherein
said cable further includes a third electrical conductor with first and second ends, and a fourth electrical conductor with first and second ends, said third and fourth conductors being helically wrapped around said first conductor; and
said electrical connector further includes a third contact member fixedly coupled to said housing, third coupling means for fixedly coupling said first end of said third conductor to said third contact member, a fourth contact member fixedly coupled to said housing, and fourth coupling means for fixedly coupling said first end of said fourth conductor to said fourth contact member.

18. An electric vehicle according to claim 17, wherein
said second, third and fourth contact members extend farther out of said housing than said first contact member.

19. An electric vehicle according to claim 18, wherein
said second, third and fourth contact members are circumferentially arranged around said first contact member.

20. An electric vehicle according to claim 19, wherein
one of said second, third and fourth contact members is a sleeve shaped contact for receiving a pin contact, while said third and fourth contact members are solid pins for being received in sleeve shaped contacts.

21. An electrical system, the combination comprising:
a female connector having an insulated housing, a pilot contact, at least two sleeve contacts fixedly coupled within said housing, and a solid pin contact fixedly coupled within said housing, said sleeve and pin contacts being circumferentially arranged around the longitudinal axis of said female connector;
a male connector having an insulated housing, a pilot contact, two solid pin contacts, and a sleeve contact, each of said contacts of said male connector projects outwardly from said housing of said male connector and has a terminal portion fixedly coupled to said insulated housing of said male connector and a pin contact portion projecting from said housing of said male connector, said sleeve and pin contacts of said male connector being circumferentially arranged around the longitudinal axis of said male connector for mating with said contacts of said female connector;
an electrical cable having at least a first conductor, a second conductor, a third conductor and a fourth conductor with each of said conductors having a first end and a second end;
first coupling means for fixedly coupling said first ends of said first and second conductors to pin contacts of one of said connectors and for fixedly coupling said first ends of said third conductor to said sleeve contact of one of said connectors so that said first ends of said first, second and third conductors are coupled to said one of said connectors at a first connection point;
second coupling means for fixedly coupling said second ends of said first, second and third conductors to an electrical device at a second connection point;
third coupling means for releasably coupling said fourth conductor between said pilot contact of one of said connectors and the electrical device, said fourth conductor having a first length between said first and second connection points, and said first, second and third conductors having lengths between said first and second connection points which are longer than said first length of said fourth conductor to disconnect electricity between said pilot contact of said one of said connectors and the electrical device upon application of a longitudinal force transmitted along said cable so that said third coupling means releases before damage occurs to said first, second and third conductors.

22. An electrical system according to claim 21, wherein
said pin contact of said female connector and said sleeve contact of said male contact being connected to a ground.

23. An electrical system according to claim 22, wherein
said female connector is mounted in a vehicle, and said male connector is electrically coupled to a power source.

24. An electrical cable and connector assembly adapted to be coupled to an electrical device, the combination comprising:
an electrical cable having at least a first electrical conductor, a second electrical conductor and a non-conducting line, said conductors having a first end and a second end, and said non-conducting line having a first end coupled to said first end of said first electrical conductor and a second end coupled to the electrical device; and
an electrical connector having a housing, a first contact member fixedly coupled to said housing, a first releasable connector for releasably coupling said first end of said first conductor to said first contact member at a first connection point within said housing, a second contact member fixedly coupled to said housing, and second coupling member for fixedly coupling said first end of said second conductor to said second contact member at a second connection point within said housing,
said second ends of said first and second conductors being coupled to the electrical device housing at a third connection point and a fourth connection point, respectively, said non-conducting line having a first length extending between said second and fourth connection points of said second conductor, said second conductor having a second length extending between said second and fourth connection points of said second conductor, said first length of said non-conducting line being shorter than said second length of said second conductor between said second and fourth connection points such that a longitudinal tensile force applied to said cable is first transmitted to said non-conducting line due to its shorter length between said second and fourth connection points of said second conductor, said first conductor being releasably coupled to said first contact member by said first releasable connector for disconnecting from said first contact member upon application of the longitudinal tensile force being transmitted along said cable to said non-conductive line so that said first conductor releases from said first contact member before damage occurs to said second conductor.

25. An electrical cable and connector assembly according to claim 24, wherein
said second end of said non-conducting line is coupled to the electrical device via a second releasable connector.

26. An electrical cable and connector assembly according to claim 25, wherein
said second end of said non-conducting line is coupled to said second end of said first electrical conductor.

27. An electrical cable and connector assembly according to claim 25, wherein
said second end of said first electrical connector is coupled to said second releasable connector.

* * * * *